Sept. 15, 1964   H. E. NELSON ETAL   3,148,664
PORTABLE LIVESTOCK LOADING CHUTE

Filed Oct. 1, 1962   3 Sheets-Sheet 1

Harry E. Nelson
Robert L. Nelson
INVENTORS

BY *[signature]*
*Attorneys*

Sept. 15, 1964 H. E. NELSON ETAL 3,148,664
PORTABLE LIVESTOCK LOADING CHUTE
Filed Oct. 1, 1962 3 Sheets-Sheet 2

Harry E. Nelson
Robert L. Nelson
INVENTORS
BY *Clarence A. O'Brien*
and *Harvey B. Jacobson*
Attorneys United States Patent Office 3,148,664
Patented Sept. 15, 1964

3,148,664
PORTABLE LIVESTOCK LOADING CHUTE
Harry E. Nelson and Robert L. Nelson, both of
R.R. 1, Dow, Ill.
Filed Oct. 1, 1962, Ser. No. 227,292
11 Claims. (Cl. 119—82)

This invention comprises a novel and useful portable livestock loading chute and more particularly pertains to a loading ramp of the portable wheeled type and which is tiltable about its supporting wheels together with means for facilitating the attachment of the device to a towing vehicle and the positioning of the device in a secure inclined position for loading purposes.

The primary object of this invention is to provide a portable livestock loader which without sacrificing mobility by a detachable connection to a towing vehicle shall provide an especially secure and stable and readily adjustable chute to effect the loading and unloading of animals from a ground level into a vehicle such as a boxcar or the like.

A further object of the invention is to provide a portable loading chute of the tiltable type having improved jack means at the upper end of the chute readily adjustable to afford a secure stable support for the upper end of the chute in its loading position and this regardless of possible inequalities in the surface of the ground.

Yet another object of the invention is to provide a device in accordance with the preceding objects wherein the jack mechanism shall be capable of easy manual operation and shall be positively moved into either its retracted or stored position or its extended hand operative position.

A further object of the invention is to provide a loading chute in accordance with the preceding objects having an improved drafting tongue construction pivotally mounted on the chute and foldable between an extended pulling position and a retracted position beneath the chute together with latch means for retaining the tongue in its retracted and stored position.

Yet another object of the invention is to provide a device in accordance with the preceding objects which shall include stock retaining hinged doors at the upper end of the chute and within the throat of the chute for preventing unintended return of cattle down the chute and wherein the door shall consist of a pair of sections each hinged to the chute for swinging movement about vertical axles together with connecting means disposed below the bottom of the chute for connecting the axles together for simultaneous movement.

Still another object of the invention is to provide a portable loading chute in accordance with the preceding objects which shall provide catwalks on both sides of the chute whereby attendants may readily supervise and facilitate passage of livestock through the chute.

These together with other objects and advantages which will become subsequently apparent reside in the details of contruction and operation as more fully hereinafter described and claimed, reference being had to the accompanying drawings forming a part hereof, wherein like numerals refer to like parts throughout, and in which:

Figure 7:
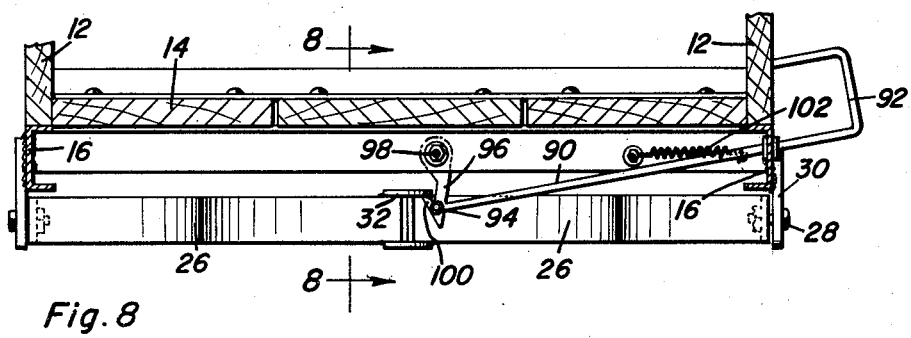
FIGURE 7 is a further detail view in vertical transverse section taken substantially upon the plane indicated by section line 7—7 of FIGURE 1 and showing the manually operated latch for retaining the draft tongue in its stored position beneath the chute.

The livestock loading chute in accordance with this invention consists of a body indicated by the numeral 10 and which includes suitable side walls 12 together with a bottom wall or floor 14, as shown particularly in FIGURE 7, and which forms a trough like body open at its top and both ends.

The bottom and side walls are secured to longitudinally extending channel shaped frame members 16 which are provided with the necessary suitable cross bracing in accordance with conventional practice and which need not be here further considered. The supporting axle 18 provided with a pair of supporting wheels 20 is secured to the underside of the chute body by means of conventional springs 22, and at a position which is preferably to one side of the center of gravity of the body so that the normal weight of the body will tend to cause it to tilt about its mounting upon the wheels and axles to the normal inclined position shown best in FIGURE 1. In this position, what may be termed the lower or forward end of the body is adapted to rest upon the ground with the upper or rear end of the body being elevated above the ground.

A draft tongue is provided at the forward end of the body to provide a means for detachably connecting the portable chute to a hitch or coupler on a tractor vehicle of any suitable character. This draft means as will be best apparent from a consideration of FIGURES 1 and 4, comprises a pair of arms each indicated by the numeral 26 and which are pivoted at 28 to depending brackets 30 secured to the side frame member 16 in a manner which will be best apparent from FIGURE 7. These arms converge towards each other away from their pivoted extremities and are fixedly attached to a coupling plate as at 32. This coupling plate as shown in FIGURE 7 provides a horizontally extending flange member for a purpose to be subsequently apparent.

Figure 1:
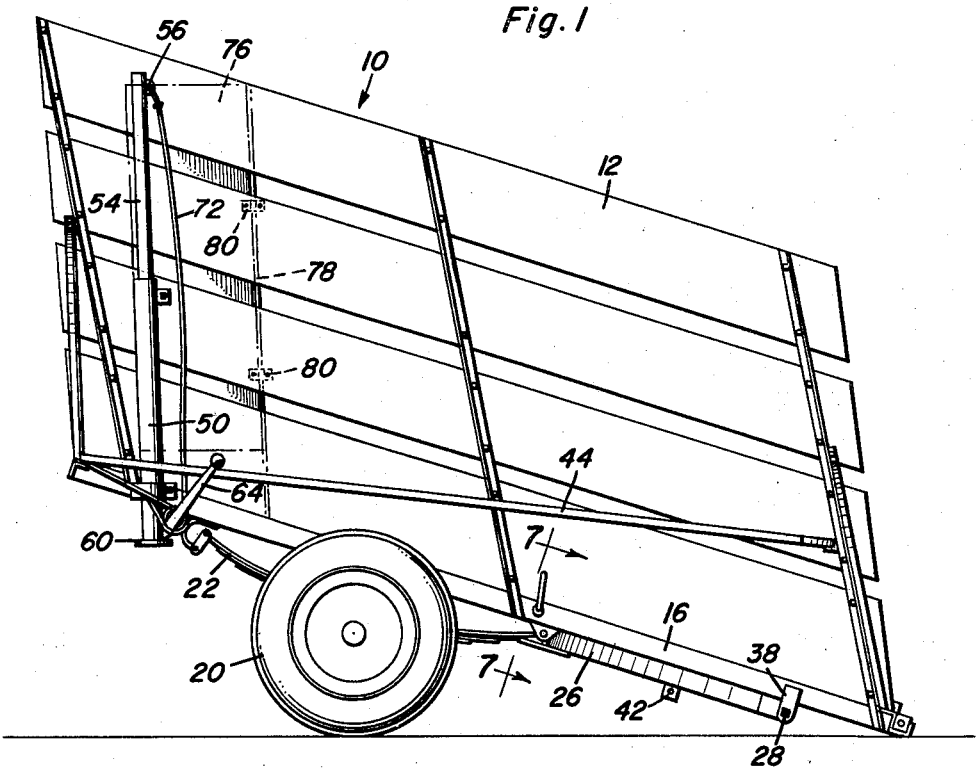
FIGURE 1 is a side elevational view showing the preferred embodiment of a portable livestock loading chute in accordance with this invention, the device being shown with the chute in an inclined position but with the stabilizing jacks raised and with the drafting tongue folded beneath the bottom of the device.

At its forward extremity, the bottom wall of the body 12 has a transversely extending member 34 provided with suitable braces 36 to rigidly connect it to the body. Secured to the member 34 is a locking bracket 38 which is provided with a locking pin 40. This bracket is so disposed that when the tongue is pivoted about the transverse axis of its pivot pins 28 from its retracted or stored position beneath the bottom of the body as shown in FIGURE 1 and as shown in full lines in FIGURE 4 to a forwardly projecting position as shown in dotted lines in FIGURE 4 where it projects forwardly beyond the front end of the body, a locking bracket or ear 42 upon the tongue may be moved into the locking bracket 38 and retained therein by the bolt 40. Thus the tongue is in an operative position for attachment to the coupling or hitch of a tractor vehicle, not shown but in a manner readily understood.

A pair of catwalks each indicated by the numeral 44 is suitably secured to the opposite sides of the body in a convenient position to enable attendants to stand thereon and assist or direct the movement of livestock up and down the chute during its operation.

Figure 5:
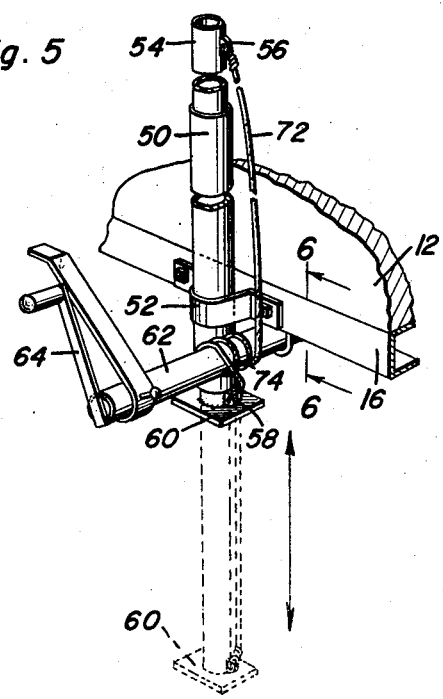
FIGURE 5 is a perspective detail view, parts being broken away and alternative positions being shown in dotted lines therein of the manual operation means for effecting raising and lowering of the stabilizing jacks of the device.
Figure 6:
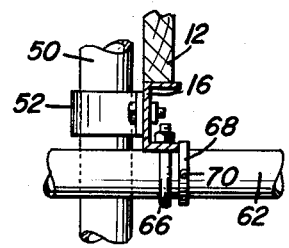
FIGURE 6 is a further detail view taken in vertical transverse section substantially upon a plane indicated by section line 6—6 of FIGURE 15.

A pair of jacks are provided at the upper or rear end of the body to assist in stabilizing and supporting the upper end of the body in a load carrying manner for the passage of heavy livestock up and down the chute. These jacks are disposed and secured to the opposite sides of the body. Each jack consists of a vertically extending tubular sleeve 50 open at its upper and lower ends and which is securely and rigidly attached as by means of clamping brackets 52 to the sides of the body as to the channel members 16 as shown in FIGURES 5 and 6. Slidably received and guidingly mounted in the sleeves 50 are standards 54 which likewise may be of tubular construction. The upper and lower ends of the standards project beyond the ends of the sleeve and are provided with laterally projecting apertured lugs as at 56 and 58 respectively at the upper and lower ends of the standards. The lower ends of the standards are preferably provided with a flat shoe or plate 60 which provides a foot adapted to seat upon the ground as indicated in dotted lines in FIGURE 5 when the standards are in their lowered position in order to support the upper end of the truck in a load bearing manner.

Manually operated means are provided to effect positive raising or lowering of the standards. This means consists of a transversely extending shaft 62 comprising a windlass and having a handle 64 at each end thereof for manual operation. As will be best apparent from FIGURE 4, the windlass 62 extends entirely transversely across the frame members 16 of the body being rotatably journaled thereon as by means of the eye bolts 66, see FIGURE 6, while collars 68 secured by setscrews 70, see FIGURE 6, prevent axial shifting of the shaft or windlass 62 with respect to the channel members. A cable 72 at each end of the shaft 62 has its mid portion wound about the windlass as at 74 and has its extremities secured to the apertured lugs 56 and 58 at the top and bottom ends of each standard. The arrangement is such that upon rotation of the windlass, each of the two standards will be positively raised or positively lowered depending upon the direction of rotation.

Figure 2:
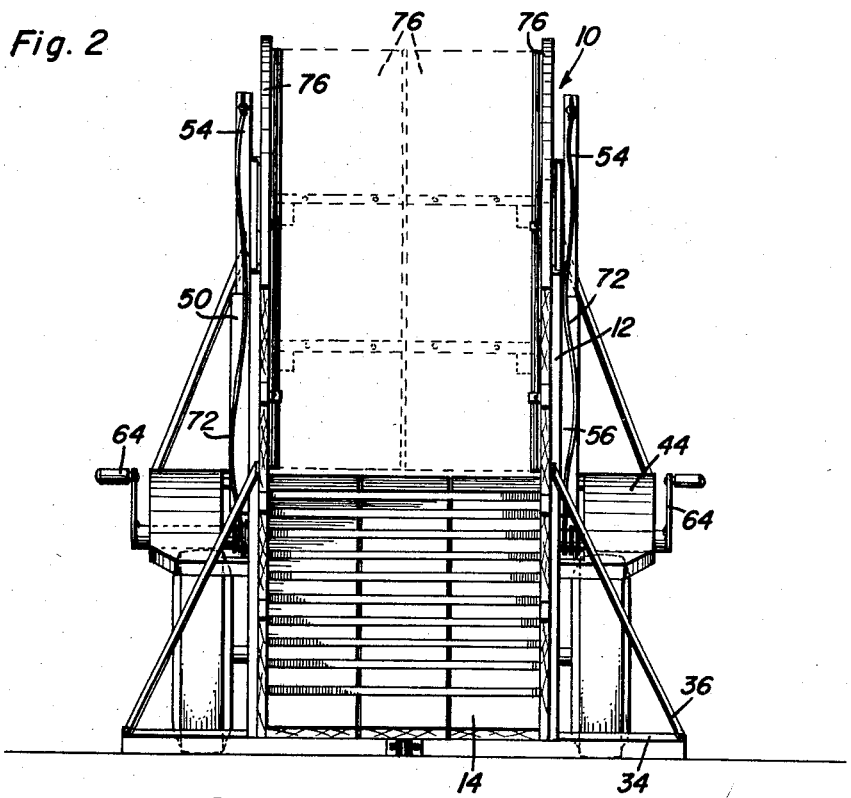
FIGURE 2 is an end elevational view of the device taken from the right side of FIGURE 1.
Figure 3:
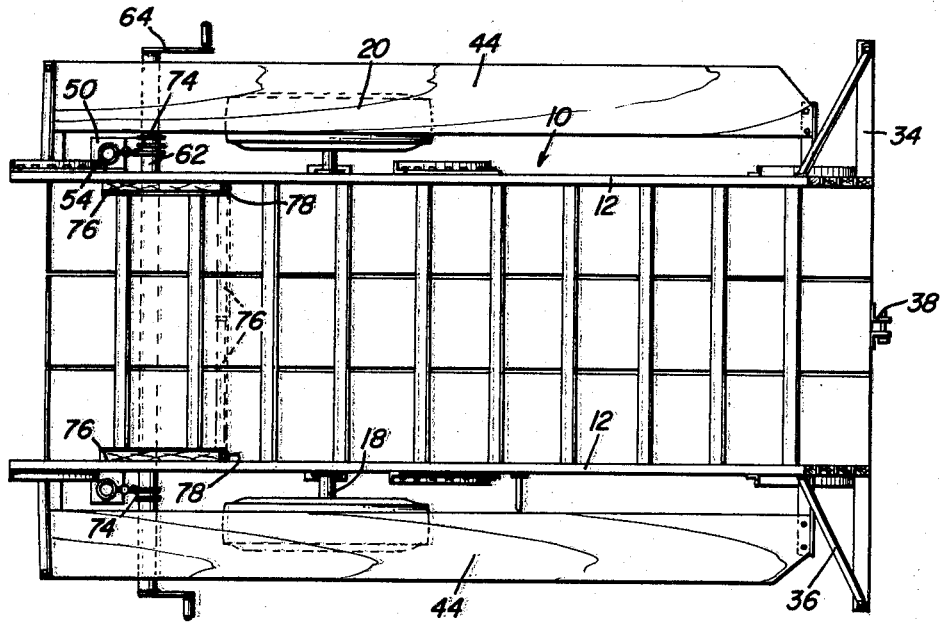
FIGURE 3 is a top plan view of the loading chute, the closure doors at the upper end of the chute being shown in full lines in their open position and in dotted lines in their closed position.
Figure 4:
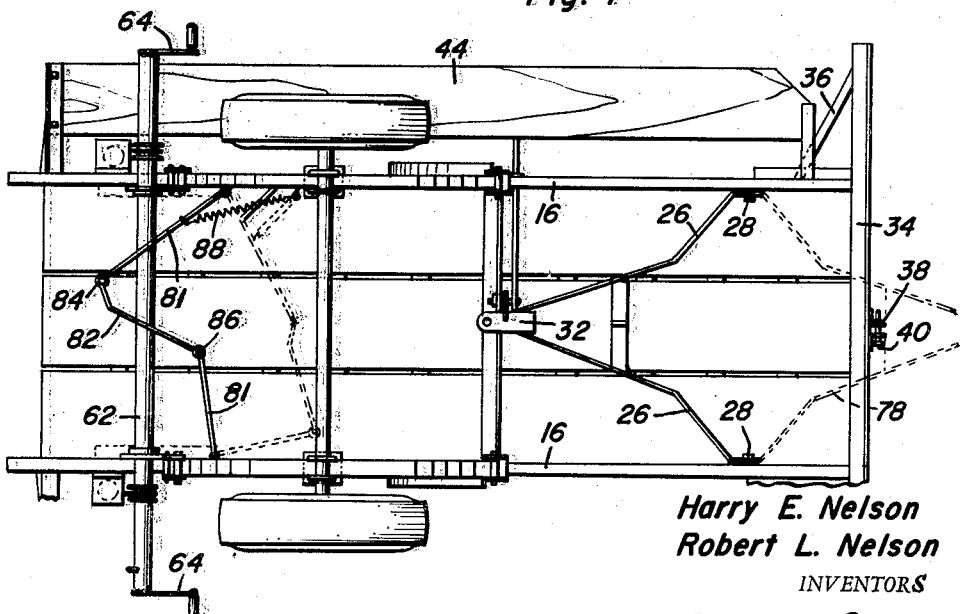
FIGURE 4 is a bottom plan view of the loading chute, the connecting linkage for the door sections being shown in full lines in the closed position of the doors and in dotted lines in the open position of the doors.

A pair of door sections each indicated by the numeral 76 and shown in full lines in their open position in FIGURE 2 and in dotted lines in their closed position therein are provided. Each door section is secured to a vertical axle 78 suitably journaled upon the side wall of the chute as by the hinges 80 shown in dotted lines in FIGURE 1. These axles extend below the body and bottom wall and have a connecting linkage attached thereto for simultaneous swinging of the doors to their transversely aligned closed position shown in dotted lines in FIGURE 3 and in dotted lines in FIGURE 2, or to their open position flat against the side walls 12 of the chute as shown in full lines in FIGURES 2 and 3. This connecting linkage consists of a crank arm 81 secured to each axle together with a connecting link 82 which is pivoted to each crank arm as by pivots 84 and 86. This arrangement is shown in FIGURE 4. A spring 88 is connected to one of the crank arms and to a suitable portion of the chute to yieldingly urge the linkage and thus the doors to their open position.

The doors may be positively closed against this spring action by any suitable means such as a cable, not shown, connected to a portion of the linkage and extending to any convenient point for easy access about the chute.

Figure 8:
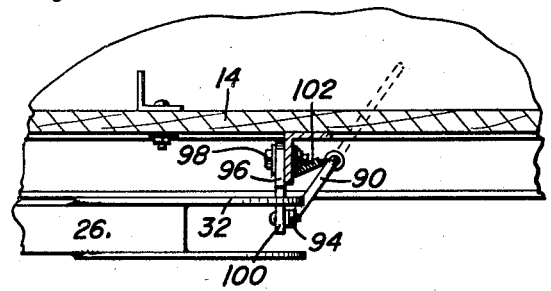
FIGURE 8 is a further detail in vertical longitudinal section taken substantially upon the plane indicated by section line 8—8 of FIGURE 7.

A latch means, manually operated is provided for effecting releasable retaining of the draft tongue in its stored or folded position beneath the bottom wall of the chute. This latch means, as will be more clearly apparent from a consideration of FIGURES 7 and 8, consists of a rod 90 extending through a suitable aperture in one of the channel members 16 and having an inturned portion 92 providing a handle or hand grip member. The other end of the latch rod is pivotally connected at 94 to a latch 96 pivoted at 98 to any convenient portion of the frame structure of the chute. The latch has a hook 100 which is adapted to releasably engage beneath flanged coupling plate 32 of the draft tongue assembly. The latch position is shown in FIGURE 7 and it will be observed that a tension spring 102 suitably secured to the latch rod 90 and to a portion of the framework of the portable chute yieldingly retains the latch in its closed position. The hook is so arranged that merely folding the draft tongue upwardly beneath the body will cause it to pass by the hook and be caught thereby. Upon pulling the latch handle 92, the latch will be withdrawn and the tongue assembly will fall downwardly by gravity about its pivotal connection away from the latch means and thus may be moved into an extended operative position as previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable livestock loader comprising a chute having bottom and side walls and a horizontal wheeled axle connected to said chute and tiltably supporting it in a normally inclined position, vertically extensible jacks secured to the exterior surfaces of the sides at the higher end of said chute, operating means connected to said jacks for positively and selectively retracting them into a stored and inoperative position and extending them into an operative load lifting and supporting position, a draft tongue secured to the lower end of said chute and movable between an extended and operative position projecting beyond the end of the chute and a retracted and stored position beneath the chute, each jack comprising a vertically extending sleeve fixedly secured to a side of said chute and a lifting standard slidably guided in said sleeve and projecting from the upper and lower ends of the latter and having upper and lower portions, said operating means being secured to the upper and lower ends of the standard, said standard lower portion having ground engaging means.

2. The combination of claim 1 wherein said tongue is pivoted to the underside of said chute for movement about a transverse axis, latch means mounted on the underside of said chute and releasably engageable with said tongue and retaining the latter in its stored position.

3. The combination of claim 1 wherein said operating means comprises a windlass rotatably journaled on the underside of said chute and disposed transversely thereof, a pair of cables each connecting said windlass to one of said jacks.

4. The combination of claim 1 including a pair of door sections mounted in the upper end of said chute upon vertically extending axles disposed inwardly of and adjacent the chute side walls, said door sections being movable between a transversely aligned closed position and an open position folded against said side walls.

5. The combination of claim 4 including a connecting linkage disposed beneath said chute bottom and connecting said axles for simultaneous movement of said sections.

6. The combination of claim 5 including resilient means connected to said linkage and yieldingly urging said sections to their open position.

7. The combination of claim 1 including a pair of brackets each secured to one side of said chute and depending downwardly therefrom, said tongue being pivoted to each of said brackets for swinging movement about an axis transverse said chute between a forwardly extending towing position and a rearwardly extended folded position beneath said chute.

8. The combination of claim 7 wherein said tongue comprises a pair of side members convergent from their pivot ends to their other ends, a flange rigidly secured to and projecting beyond said other ends, latch means mounted on the underside of said chute and releasably engageable with said flange and retaining said tongue in said stored position.

9. The combination of claim 8 wherein said latch means includes a latch lever having a hook means pivotally mounting said latch lever for movement about an axis extending longitudinally of said chute, spring means connected to said latch lever and yieldingly urging said hook into position for engaging said flange when said tongue is in its folded position.

10. The combination of claim 9 including a latch release rod secured at one end to said lever and extending transversely of said chute to a position exteriorly thereof.

11. The combination of claim 10 wherein said spring means is connected to said chute and to said release rod.

References Cited in the file of this patent

UNITED STATES PATENTS

| | | |
|---|---|---|
| 753,833 | Copley | Mar. 1, 1904 |
| 2,529,530 | Abildgaard et al. | Nov. 14, 1950 |
| 2,593,559 | Heldenbrand | Apr. 22, 1952 |
| 2,732,827 | Grell | Jan. 31, 1956 |
| 2,941,813 | Price | June 21, 1960 |
| 3,020,882 | Browning | Feb. 13, 1962 |